United States Patent [19]

Zygiel

[11] Patent Number: 4,922,662
[45] Date of Patent: May 8, 1990

[54] RECIPROCATING JIG ADAPTER FOR GRINDING MILLS

[76] Inventor: Stanley D. Zygiel, 420 Warren Rd., Glenview, Ill. 60025

[21] Appl. No.: 79,449

[22] Filed: Jul. 30, 1987

[51] Int. Cl.⁵ .............................................. B24B 9/00
[52] U.S. Cl. ........................................ 51/34 C; 51/58
[58] Field of Search ................. 51/34 R, 34 C, 34 H, 51/58

[56] References Cited

U.S. PATENT DOCUMENTS

| | | | |
|---|---|---|---|
| 675,967 | 6/1901 | Nyström | 51/34 C |
| 1,100,528 | 6/1914 | Brown | 51/34 C |
| 2,333,169 | 11/1943 | Glaude | 51/34 C |
| 3,618,268 | 11/1971 | Sunnen | 51/34 R |
| 4,606,150 | 8/1986 | Grimm | 51/34 C |

Primary Examiner—Frederick R. Schmidt
Assistant Examiner—Blynn Shideler

[57] ABSTRACT

A jig adapter for a grinding mill having an exposed grinding wheel or burr operated by a suitable pneumatic motor, with the motor and wheel mounted on a reciprocating plate suspended from a fixed adapter plate removably attached to the quill of the grinding mill. The reciprocal movement being developed by an eccentric pulley wheel rotatable by an electric motor. The adapter plate supports a series of leader pins which are in turn slidably mounted in adjustable split bushings mounted in the reciprocating plate, with all of the movable parts being incapsulated in an expandable accordion-like bellows.

5 Claims, 3 Drawing Sheets

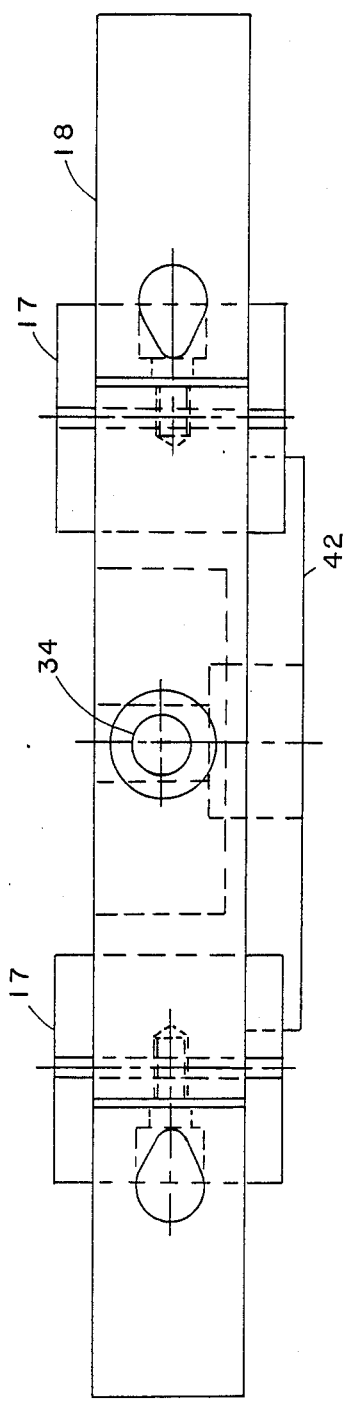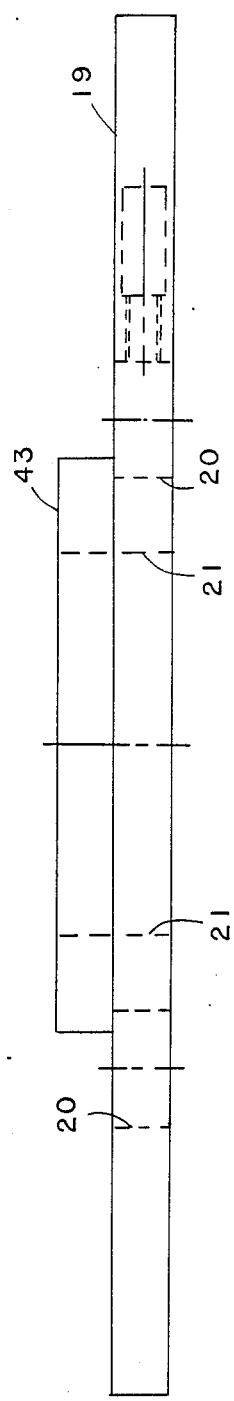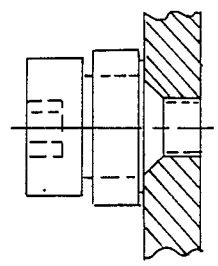
FIG. 3
FIG. 4
FIG. 5

RECIPROCATING JIG ADAPTER FOR GRINDING MILLS

BRIEF DESCRIPTION OF THE PRIOR ART

Prior adapters for grinding apparatuses, especially for the CNC mill were expensive and elaborate mechanisms, void of the necessary stability in motion to achieve the dimensional work function required.

The prior adapters were without sufficient acceptable structure by which a constant continuous reciprocal movement was achieved. Furthermore, the prior apparatuses did not incapsulate the essential movable parts and thus such structure was exposed to the surplus disposed material produced by the grinding operation. This dust and other contaminates disrupted the required tolerances of reciprocal movement and rendered the fixture ineffective.

BRIEF SUMMARY OF THE INVENTION

The present invention relates to an adapter for a grinding mill by which a working tool may be continuously reciprocated with minimal tolerance departure.

The fixture of this invention includes a mounting plate readily attachable to the quill of the milling machine, with the mounting plate supporting a series of depending leader pins which slidably project through suitable split adjustable bushings mounted in a reciprocating plate. By means of an eccentric arm connection between a pulley driven drive wheel and the movable plate, the operating tool head of the adapter is reciprocally moved in a controlled manner.

A general object of this invention is to provide a relatively simple, inexpensive, readily operated, adapter fixture of relatively lightweight and small size for grinding machines and the like, which can be quickly adjusted and operated to perform substantially the desired operation.

A further object of this invention is to provide an operating adapter for a grinding mill wherein all of the substantial movable parts are incapsulated within a protective covering of an accordion or bellows type, so as to accomodate the reciprocal movement of the parts of the fixture.

Other objects will appear hereinafter.

BRIEF DESCRIPTION OF THE DRAWINGS

The invention will be best understood by reference to the accompanying drawings showing the preferred form of construction by which the objects of the invention are achieved and in which;

FIG. 3 is a side elevational view of the reciprocating plate of this invention, FIG. 4 is a side elevational view of the base plate of this invention, and FIG. 5 is a detailed sectional view of the pivotal mounting of the operating arm to the reciprocating plate of this invention.

GENERAL DESCRIPTION OF THE INVENTION

Figure 1:
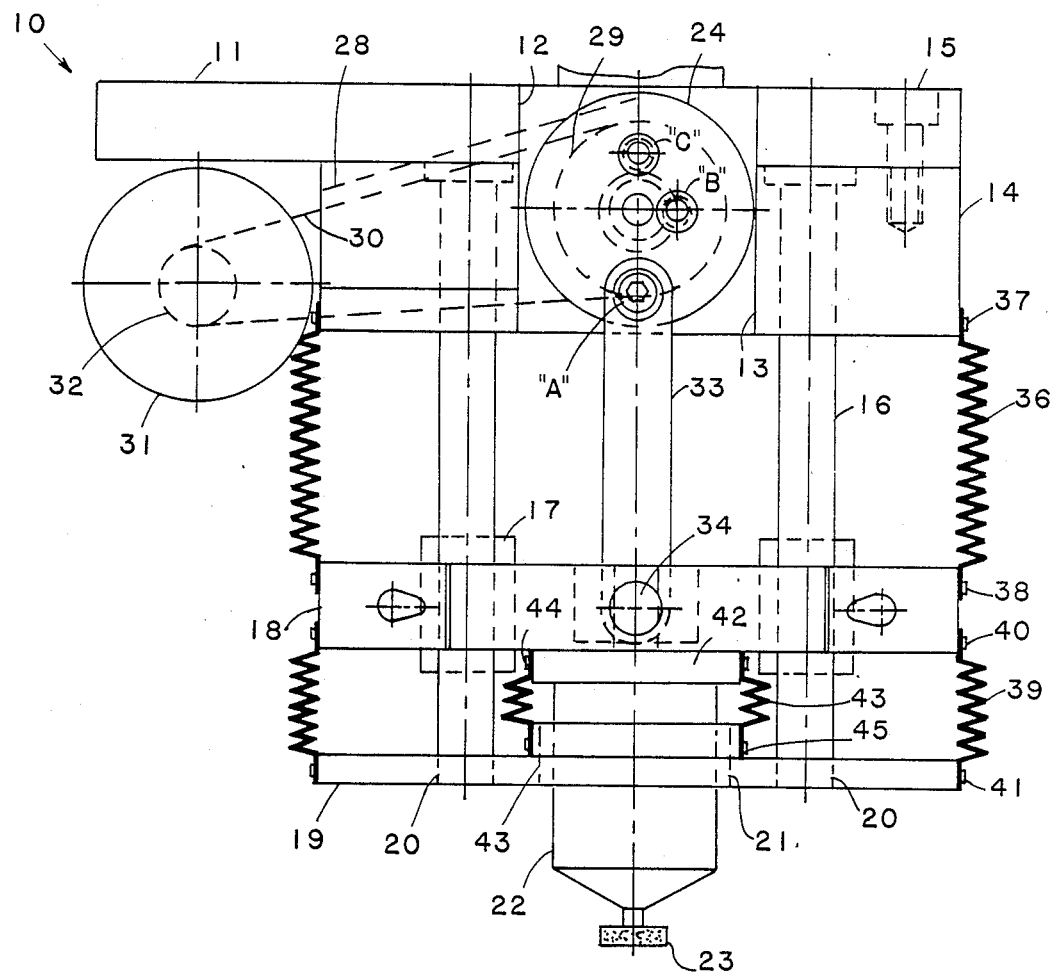
FIG. 1 is a side elevational view of the reciprocating jig adapter of this invention.

By a split adjustable collar of a type well known in the art, the jig adapter 10 of this invention may be conveniently attached to the quill of a grinding machine.

The jig adapter 10 of this invention includes an adapter plate 11 fixed to the split collar 12 for attachment to the quill of the grinding machine. Connected to the underside 12 of the adapter plate 11, by a series of bolts 13 is a circular hub 14.

Depending from the underside 12 of the adapter plate 11, is a series of circumscribed leader pins 16. Each of these leader pins 16 are slidably projected through split adjustable bushings 17 mounted in a carriage plate 18. By this arrangement and through the split bushings 17, the carriage plate 18 is slidably mounted upon the leader pins 16. By adequate adjustment of the bushings 17 the carriage plate 18 will be free to move reciprocally along the leader pins 16 with minimum deflection out of its normal plane.

A stabilizing base plate 19 is likewise provided with a series of circular apertures 20 for slidably receiving the leader pins 16. The stationary base plate 19 is provided with a centrally located opening 21 in which is mounted a suitable pneumatic motor 22 for effecting operation of the tool head 23.

Figure 2:
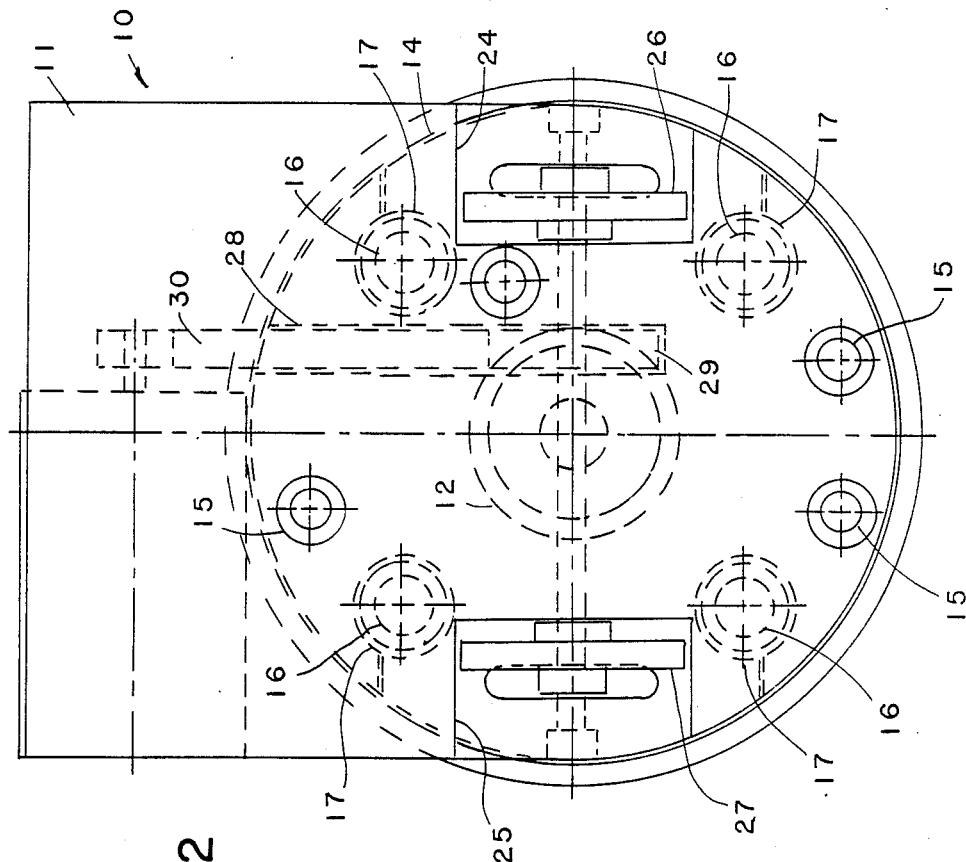
FIG. 2 is a top plan view of the jig adapter of this invention.

Referring to FIG. 2 it is shown that the adapter plate 11 and the hub 14 are provided with diametrically opposite cutouts 24 and 25, each of which interrupt the circumference of the plate 11 and hub 14 as shown. Without the cutouts 24 and 25 and mounted on a rotatable shaft extending through a center bore formed in the hub 14, are mounted a pair of pulley driven drive wheels 26 and 27. It should be noted that both the adapter plate 11 and hub 14 are slotted as at 28 so as to accomodate an internal pulley wheel 29 fixedly mounted on the rotatable shaft, as well as a pulley belt 30. To the underside of the adapter plate 11 is mounted, in any suitable manner, an electric motor 31 which normally rotates a plulley wheel 32. Thus when the motor 31 is energized, through the function of the pulley 30, the wheels 26, 27 and 29 will be caused to rotate about their shaft mounting.

Each of the drive wheels 26 and 27 have connected thereto a drive arm 33. The free ends of each of the drive arms 33 are by pivot pins 34 connected to the carriage plate 18. It should be noted that the opposite ends of the arms 33 may be pivotally connected to their respective drive wheels 26 and 27, at points "A", "B" and "C", each having different radii from the centers of the wheels. This adjustability will determine the length of the reciprocating stroke of the carriage 18 and the stabilizing plate 19 during operation of the adapter.

As shown in FIG. 1 a expandable bellows 36 is attached to the peripheral lower edge of the hub 14 by a suitable clamp 37 while the opposite end of the bellows 36, is by a clamp 38, attached adjacent to the upper peripheral edge of the carriage plate 18. A similar bellows 39 extends between the lower peripheral edge of the carriage plate 18 and the stabilizing plate 19 and are attached thereto by respective band clamps 40 and 41.

It should also be noted that the carriage plate 18 provided a step 42, while the stabilizer plate 19 provides a like step 43 with each of the steps providing an attachment for an internal bellows 43 connected by suitable band clamps 44 and 45. By this arrangement the critical movable elements of the adapter jig are completely incapsulated so as to be free from contamination during operation of the fixture.

From the foregoing it is aparent that I have developed an adapter jig for use with a grinding machine and in which close tolerances of movement is achieved and maintained during operation, with the degree of movement adjustable so as to vary the working stroke of the grinding tool, and with all of the critical movable parts incapsulated so as to be free from contamination.

While there has been illustrated and described the preferred form of construction for carrying this invention into effect, such form is capable of variation and modification without departing from the spirit of the invention, therefore, I do not wish to be limited to the precise details of construction as set forth thus making available such variations and modifications as come within the scope of the appended claims.

Having thus described my invention, what I claim as new and desire to protect by Letters Patent is:

1. A reciprocating jig adapter for grinding mills having a working tool supporting quill with the adapter providing:
   (a) a stationary supporting plate adapted to be removably fixed to the quill of the grinding mill and a movable tool carrying carriage,
   (b) means for removably attaching said supporting plate to the quill of the grinding mill,
   (c) oscillating means carried by said supporting plate for supporting said carriage for reciprocal movement through a plane parallel to the quill of the grinding mill,
   (d) means depending from said supporting plate for guiding said carriage and for maintaining it in a plane parallel to said stationary plate during it's reciprocal movement,
   (e) means carried by said supporting plate for operating said oscillating means,
   (f) means for varying the degree of oscillating movement of said carriage relative to said supporting plate, and
   (g) means for incapsulating said oscillating means and said guiding means during reciprocal movement of said carriage.

2. A reciprocating jig adapter for grinding mills as defined by claim 1 wherein said means for guiding said carriage comprise a plurality of circumferentially arranged leader pins depending from said stationary plate, and bushing members carried by said carriage for slidably receiving said leader pins so as to maintain it in a plane parallel to said stationary plate during it's reciprocal movement.

3. A reciprocating jig adapter for grinding mills as defined by claim 1 wherein said means incapsulating said oscillating means and said guiding means comprise an expandable bellows extending between said stationary supporting plate and said movable carriage.

4. A reciprocating jig adapter for grinding mills as defined by claim 1 and including a stabilizing base plate journalled upon said guiding means and movable with said carriage for stabilizing the tool member carried by said carriage during it's reciprocal movement relative to said stationary supporting plate.

5. A reciprocating jig adapter for grinding mills as defined by claim 4 and including means for incapsulating said stabilizing base relative to said carriage and incapsulating means between said carriage and the working tool member carried thereby.

* * * * *